6/21/77 XR 4,030,833

SR

United States Patent [19] [11] 4,030,833

Barbieri [45] June 21, 1977

[54] COLOR FILTER DETERMINING APPARATUS

[75] Inventor: Siegfried Barbieri, Brixen, Italy

[73] Assignee: Durst AG Fabrik Fototechnischer Apparate Bozer, Gerbergasse, Italy

[22] Filed: Mar. 6, 1975

[21] Appl. No.: 555,933

[30] Foreign Application Priority Data

Mar. 13, 1974 Italy .................................. 4835/74

[52] U.S. Cl. ............................... 356/175; 350/266; 350/315; 350/317; 350/318; 355/38

[51] Int. Cl.² ........................................... G01J 3/50

[58] Field of Search .................. 356/175, 186, 188; 350/266, 311, 315, 317, 318; 355/35, 38, 67, 68, 71, 32

[56] References Cited

UNITED STATES PATENTS

| | | | |
|---|---|---|---|
| 2,780,155 | 2/1957 | Debrie | 350/317 X |
| 3,292,488 | 12/1966 | Griffith | 356/175 X |
| 3,467,475 | 9/1969 | Celio et al. | 356/188 X |
| 3,709,600 | 1/1973 | Ganshorn | 350/266 UX |

*Primary Examiner*—Edward S. Bauer
*Assistant Examiner*—F. L. Evans
*Attorney, Agent, or Firm*—Connolly and Hutz

[57] ABSTRACT

The filter insertion settings of a colored light projector are determined by projecting the colored light through different light color windows of a test probe onto a light measuring device to provide a predetermined signal. Diaphragms on the color windows are adjusted to provide a predetermined balanced format for a predetermined balanced light condition. The filters on the projector are adjusted for a given light, such as through a color negative to be printed, to cause the aforementioned predetermined signal to be generated by the light measuring device. Different settings on different probes may be provided for different series of predetermined desirable color formats or combinations, such as for different types of color negatives — for example, for verdant scenes or sea scapes. The optical diaphragms may be conveniently provided by adjustable screws running into the windows.

14 Claims, 6 Drawing Figures

COLOR FILTER DETERMINING APPARATUS

BACKGROUND OF THE INVENTION

The invention relates to a color filter determining apparatus, wherein a measurement of the basic color components occurs by means of at least one photoelectric transducer, which is a part of a measuring circuit.

For the determination of the filter values required for the copying of color transparencies, such as negatives, filter setting apparatus have been successful whose measuring principle resides in the measuring of reciprocal proportions of the basic color components. In most of the known apparatus of this type, photoelectric transducers, usually photoconductive cells, are employed as the measuring receptor, which forms a branch of a measuring bridge. For the determination of the filter values necessary for the copying of a negative, the light penetrating through the negative to be copied is conducted through the color filter to the measuring receptor and the measuring bridge is balanced by potentiometers, one color filter and one potentiometer pertaining to each basic color to be measured. Scales are provided for the control elements and are calibrated in filter values. In this manner it is possible to determine for the copying procedure the filter values necessary for the correction of possible color errors in the negative from the positon of a potentiometer pertaining to a certain color component, indicated after the measurement.

Calibration of known color filter determining apparatus takes place by the balance of the measuring bridge for each of the basic colors, a negative being employed for the measuring which has a color distribution characteristic for a certain number of negatives to be processed. The balance state of the measuring bridge achieved in this manner determines the reference values for all negatives of a certain series to be measured thereafter.

This reference value is determined either by individual registering potentiometers in the measuring bridge or by scales with adjustable zero points for the balancing potentiometers.

SUMMARY

The new color mixing heads for enlarging apparatus, wherein the filter values may be adjusted continuously, are the subject of the novel filter determining process of the invention, wherein the adjustment of the measuring bridge may be accomplished by the insertion of the filter values at the color mixing head to achieve a balanced color condition instead of changing the resistance values of the potentiometers. By means of this process, the possibilities of error are avoided which could result because of the inaccuracies in the calibration of the scale values at the filter determining apparatus and of the filter scales at the color mixing head.

An object of the invention is to provide a filter adjusting apparatus for the above-mentioned filter determining process, wherein the reference values resulting in the calibration may be registered without engaging the measuring circuit and no electronic components are needed for the registering of the reference values. The problem is solved according to the invention by a color filter adjusting apparatus, wherein the reference values resulting in the calibration adjustment of the measuring circuit are registered by adjustable optical diaphragms pertaining to the individual basic color components to be measured. A considerable simplification of the measuring circuit and an increased stability of the calibration values are achieved thereby, because they are no longer affected by the temperature sensitivity of electronic components.

In a further development of the invention, the optical diaphragms are arranged in groups on a filter holder in such a manner that reference values, which result from calibrations for several different negatives or different processing materials, may be registered independently of each other.

This invention thus also provides a process for determining the filter insertion settings for a colored light mixing head by projecting the colored light through different light color windows of a test probe onto a light measuring device to provide a predetermined signal, which is indicative of a predetermined balanced light condition. Diaphragms on the color windows are adjusted to transmit the predetermined balanced format onto the measuring device for a predetermined balanced light. The filters on the projector are adjusted for a given light, such as through a particular color negative to be printed, to cause the aforementioned predetermined signal to be generated by the light measuring device. Different settings on different probes may be provided for different series of predetermined desirable color combinations, such as for different types of color negatives — for example, for verdant scenes or sea scapes. The optical diaphragm may be conveniently provided by adjustable screws running into the windows.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
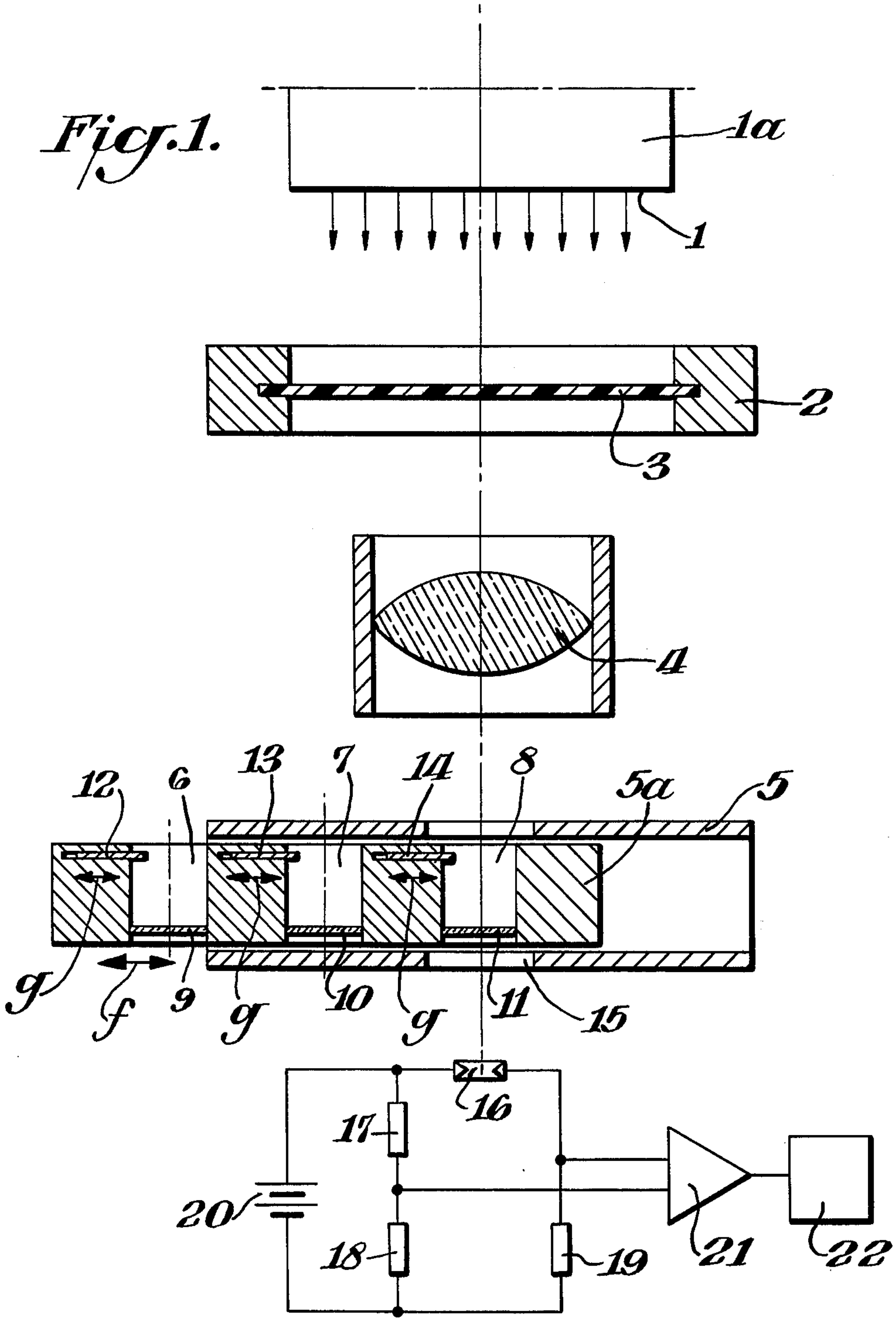
FIG. 1 is a schematic view in elevation of a novel color filter adjusting apparatus, partially in cross-section.

Below the light emergence surface 1 of a color mixing head 1*a*, not further illustrated, in a negative holder 2 is held a color transparency, such as negative 3, for which the filter values, needed in the copying process, are to be measured in the color mixing head. Below a lens 4, employed for the copying of the color negative 3, is mounted a filter holder 5*a*, illustrated in cross-section, movable in guideways 5, the holder having three metering orifices 6, 7, 8 and being movable in the direction of arrow *f* perpendicularly toward the projection axis of lens 4. In each of these metering orifices is inserted a color filter in one of the three basic colors, e.g. a red filter 9 in metering orifice 6, green filter 10 in metering orifice 7 and a blue filter 11 in metering orifice 8. Each of the metering orifices 6, 7, 8 is coverable by a separate optical diaphragm 12, 13, 14, movable in the direction of arrow *g*, whose depth of insertion into the particular measuring orifice may be set by a corresponding adjusting member not illustrated in the drawing. Optical diaphragms 12, 13, 14 are illustrated only schematically in order to explain their function, the most diversified designs being feasible.

Filter holder 5*a* is movable in its guideways 5 in such a manner that at any given time one of the three metering orifices 6, 7, 8 may be brought into the path of rays of lens 4. Guideway 5 for filter holder 5*a* has a central light-transmitting aperture 15.

Arranged preferably in the optical axis of lens 4, below filter holder 5*a*, is a photoelectric transducer, e.g. a photoconductive cell 16, which together with resistors 17, 18, 19 form a measuring bridge, which is supplied by a power source 20. The output signal of the measuring bridge is amplified by an amplifier 21 and the state of balance of the measuring bridge made visible in an indicating unit 22.

In the described exemplary embodiment, the color mixing head 1*a*, the negative holder 2 and the lens 4 are parts of an enlarging apparatus, a more detailed illustration of the connecting parts thereto being eliminated. Filter holder 5*a*, its guideway and photoconductive cell 16 are parts of a measuring probe, which may be inserted under lens 4 for the measuring and may again be removed from the copying path of rays during the copying process.

The color filter determination occurs separately for each basic color according to the following procedure: Filter holder 5*a* is moved under the lens until measuring orifices 6 or 7 or 8 is situated in the optical axis of lens 4, depending on the basic color to be measured. The color filter pertaining to this basic color in the color mixing head is moved in a known manner until the measuring bridge is balanced, in which case the balanced state may be observed on the indicating unit 22. This color filter determination takes place normally for all three basic colors.

For the calibration of the color filter determining apparatus, an ideal copy of a negative with the characteristic color distribution is first prepared in a series of experiments with various filter values. Thereupon, the measuring bridge is balanced for each of the basic colors by setting the particular diaphragms 12 or 13 or 14 with a color filter setting in the color mixing head corresponding to the color filter setting present in the preparation of the ideal copy and thus for each individual color component, the reference value is determined for all subsequent measurements, the negative mentioned being situated in the negative holder 2.

Figure 2:
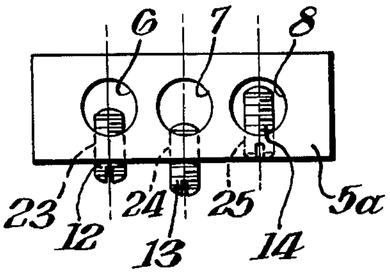
FIG. 2 is a top plan veiw of a color filter holder in the form of a slide as shown in FIG. 1.

In FIG. 2 is illustrated a movably filter holder 5*a* with measuring orifices 6, 7, 8, wherein optical diaphragms 12, 13, 14 are implemented by screws, which in the calibration of the color filter determining apparatus are set by means of a screw driver within threaded bores 23, 24, 25, which open into metering orifices 6, 7, 8.

The filter holder, with the shape of the measuring orifices and diaphragms remaining constant, may also be in the shape of a disk, which is rotatable about an axis in such a manner that the metering orifices provided at the circumference of the disk may individually be inserted into the path of rays of lens 4.

Figure 4:
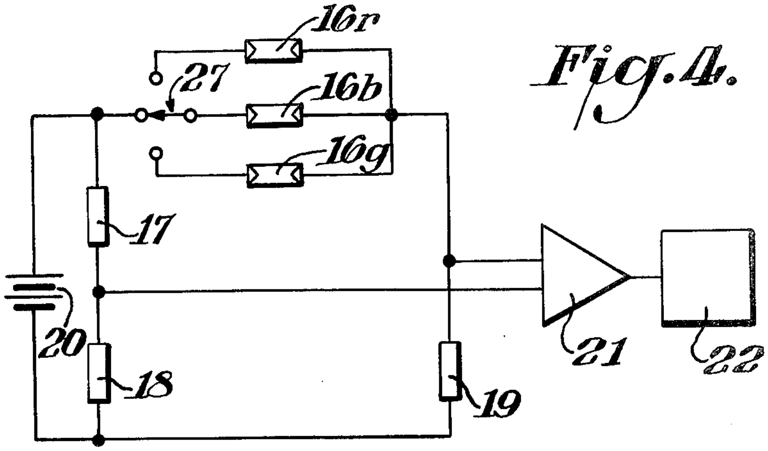
FIG. 4 is a specific embodiment of a measuring circuit using the metering probe shown in FIG. 3.
Figure 3:
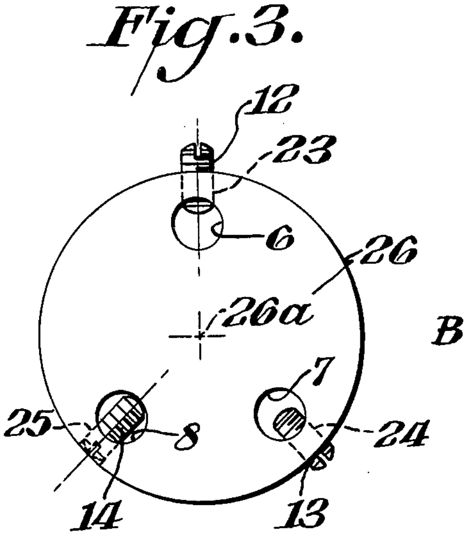
FIG. 3 is a top plan view of a metering probe stationarily mounted under the lens of an enlarging apparatus.

In the arrangement illustrated in FIG. 3, metering orifices 6, 7, 8 in the form of a circular plate 26 are arranged in a measuring probe at such a distance from the center 26*a* of plate 26 that in its disposition under lens 4, all metering orifices are simultaneously situated in its path of rays. In this instance, arranged under each individual metering opening 6, 7, 8 is a photoelectric transducer 16*r*, 16*b* or 16*g*, respectively, so that a simultaneous measurement of the three color components becomes possible. Also in this embodiment, provided as optical diaphragms 12, 13, 14 are screws which are adjustable in threaded bores 23, 24, 25. In this metering arrangement each individual photoelectric transducer 16*r*, 16*b*, 16*g* may either be part of a separate measuring bridge or it may be incorporated in the manner shown in FIG. 4 in a single measuring bridge, the photoelectric transducers corresponding to the individual basic colors being connectable with the remaining parts of the measuring bridge by means of a selector switch 27.

In the exemplary embodiment, wherein all color components are measured simultaneously by separate photoelectric transducers, it is possible to eliminate color filters 9, 10, 11 and to select the individual photoelectric transducers 16*r*, 16*b*, or 16*g*, respectively, in such a manner that they each only react at any given time to the red, blue, or green basic color, respectively. In the arrangement illustrated in FIG. 3, it is suitable to provide a light-mixing column between lens 4 and plate 26 in order to enable an integral measurement of the negative, even though the photoelectric transducers are arranged at a certain distance from the optical axis of lens 4.

Figure 5:
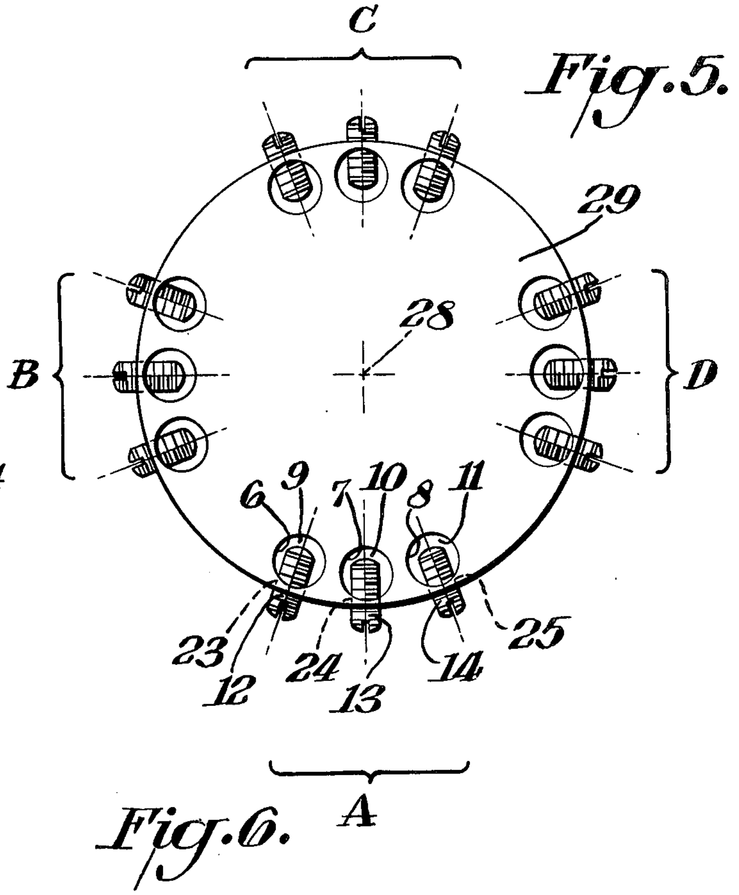
FIG. 5 is a top plan view of a color filter holder rotatably mounted under the lens.

FIG. 5 shows a filter holder, wherein the reference values may be registered for several negatives with varying characteristic color distribution or for several varying processing materials used in the copying process. On a disk 29, rotatable about an axis 28 parallel to the optical axis of lens 4, are contained several groups of metering orifices with helical optical diaphragms 12, 13, 14 adjustable in the threaded bores 23, 24, 25. Each of the metering orifices 6, 7, 8 contains a color filter 9, 10, 11 in one basic color each. For the measuring procedure, each of the metering orifices may be brought to coincide below lens 4 with its optical axis and the measurement carried out in the same manner as described above with respect to filter holder 5*a*.

FIG. 5 illustrates four each similarly constructed groups of measuring orifices under the reference designations A, B, C, D, so that for this design four separate registering possibilities exist for equally as many processing variants, which allow a convenient and quick adaptation to various photographic subject groups or various processing materials without making it necessary to repeat the calibration.

The number of these measuring orifices groups is arbitrary and only affects the dimensions of disk 29.

Figure 6:
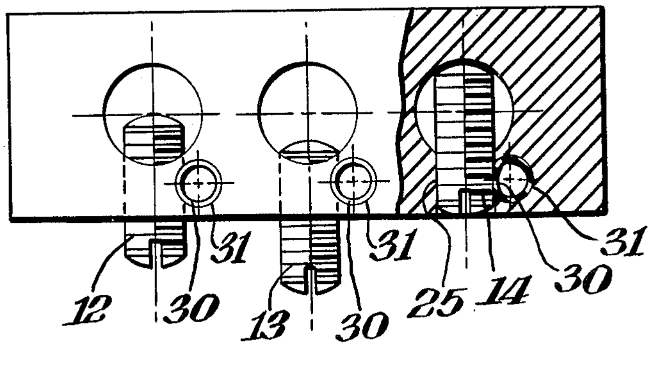
FIG. 6 is a further development of the color filter holder shown in FIG. 2.

In order to obtain in the calibrating procedure a play-free installation of the helical optical diaphragms 12, 13, 14, they may have an elastic seat in the particular threaded bore. This may be achieved, for example, by a design indicated in FIG. 6, wherein a tube 30 of elastic material is inserted into a bore 31, perpendicular to threaded bore 25 of a helical optical diaphragm 14, in such a manner that it is elastically deformed upon insertion of the helical optical diaphragm and exercises a corresponding compression thereon.

A further possibility of achieving a play-free installation of the helical optical diaphragms consists of providing therein a bore, preferably perpendicular to the longitudinal axis of the optical diaphragms, which is filled with elastic material protruding somewhat beyond the rim of the threads, the material being shaped upon insertion of the helical optical diaphragm into the particular threaded bore and exercises a corresponding compression thereon.

For the movable filter holder *5a* as well as for the rotatable disk 29, a suitable indexing device may be provided in order to obtain an exact positioning of the individual metering orifices 6, 7, 8 during the measuring and to assure that the measuring results may be reproduced. A more detailed illustration of such an indexing device is not provided, since many possible solutions are known and may be used in the same manner.

In the various specific embodiments, measuring arrangements are described at times, wherein metering orifices are provided for the three basic colors. However, instances of application are feasible wherein fewer than three metering orifices are needed and again other instances wherein more than three metering orifices are provided.

The recording of the reference values, determined in the calibration, with the help of adjustable optical diaphragms which are inserted in front of a photoelectric transducer, may be utilized not only in the color filter determining apparatus described, wherein the measurement takes place directly under the lens of an enlarging apparatus, but also in color filter determining apparatus, wherein the measurement is carried out in the copying plane, in the lens plane or in any other plane of an enlarging apparatus.

If in such a color filter adjusting apparatus a photoelectric transducer is accommodated in a measuring probe, the arrangements described in the exemplary embodiment may be employed with the necessary adjustments in dimensions.

If a photoconductor leads from a measuring probe to a photoelectric transducer situated in a basic apparatus, as provided in some known apparatus, the adjustable optical diaphragms are provided in the basic apparatus in a corresponding manner.

The detection of the reference values described are applicable not only to measuring circuits, which contain a measuring bridge, but also to all other known measuring circuits with the most diversified photoelectric transducers as measuring receptors.

I claim:

1. A color filter determining apparatus for determining the required insertion of color filters in the path of colored light projected from a color head incorporating the color filters comprising a housing, color windows in the housing relating to the color components in the projected light, light filters in each of the windows to cause differently colored light components to pass through them, adjustable optical diaphragms in each of the color windows for adjusting the amount of each of the color light components projected through each of the color windows whereby a predetermined balanced color combination is caused to pass through the color windows when the color filters are inserted in the projected light to provide the predetermined measured color balance, and a light intensity measuring means is mounted on the housing in optical line with at least one of the color windows for determining when the predetermined balance of light components is passing through the color windows from the color head and its color filters inserted in the path of light projected from it.

2. A color filter determining apparatus as set forth in claim 1 wherein the color windows comprise apertures having color filter material mounted therein, the adjustable optical diaphragms comprise light blocking means, and adjustable means mounting the light blocking means an adjustable distance into the apertures.

3. A color filter determining apparatus as set forth in claim 2 wherein the adjustable optical diaphragms comprise screws mounted in the housing an adjustable distance into the apertures.

4. A color filter test probe for adjusting the color content of a color projecting apparatus having a color head incorporating color filters comprising a housing, color windows in the housing each passing different color components in the projected light, adjustable optical diaphragms in each of the color windows for adjusting the amount of each of the color components transmitted through each of the color windows and, light intensity measuring means is mounted on the housing for disposition in optical line with the color windows for determining when the predetermined balance of light components is passing through the color windows from the color head and its color filters inserted in the path of light projected from it.

5. A color filter test probe as set forth in claim 4 wherein the color windows comprise apertures, color filter material in the apertures, and the optical diaphragms comprise screws mounted in the housing and running through the apertures.

6. A color filter test probe as set forth in claim 4 wherein slide means is provided for connecting the housing to the color projecting apparatus whereby each of the windows may be sequentially inserted in the path of the projected light.

7. A color filter test probe as set forth in claim 6 wherein the slide means comprises a slide guide, and guide aperture means is provided in the slide guide for projecting light through each of selected color windows.

8. A color filter test probe as set forth in claim 4 wherein rotatable means is provided for removably mounting the housing on the color projecting apparatus.

9. A color filter test probe as set forth in claim 4 wherein rotatable means is provided for removably mounting the housing on the color projecting apparatus, and several groups of color windows are installed on the housing for providing different formats of color components for different combinations of color components in the projected light.

10. A color filter test probe as set forth in claim 4 wherein stationary mounting means is provided on the housing for mounting it at a predetermined position in the path of the projected light whereby each of the color windows is simultaneously operative.

11. A color filter test probe as set forth in claim 10 wherein a light measuring means is mounted in optical line with each of the color windows.

12. A process for determining the color filter insertion in a color light head for projecting light through color transparencies to print them comprising the steps of obtaining predetermined balanced light combinations from the color light head, inserting adjustable color windows between the color head and a light measuring device, the adjustable color window each incorporating a filter for passing different color light components, an adjustable diaphragm for adjusting the amount of light component passing through the window, obtaining a predetermined signal on the light measuring device for the predetermined balanced light combinations projected by the color head by adjustment of each of the adjustable diaphragms in the color windows, and subsequently adjusting the color filter insertion in the color light head to obtain the aforementioned predetermined signal of the measuring device when the colored light is transmitted through the adjusted color windows for projecting light through a particular transparency to be printed.

13. A process as set forth in claim 12 wherein the predetermined balanced light combinations are obtained from standardized transparencies through which the colored light is initially projected from the mixing head.

14. A process as set forth in claim 12 wherein several standardized transparencies and sets of color windows are provided.

* * * * *

UNITED STATES PATENT AND TRADEMARK OFFICE
CERTIFICATE OF CORRECTION

PATENT NO. : 4,030,833
DATED : June 21, 1977
INVENTOR(S) : Siegfried Barbieri

It is certified that error appears in the above-identified patent and that said Letters Patent are hereby corrected as shown below:

Page 1, column 1, change:

"[73] Assignee: DURST AG FABRIK FOTOTECHNISCHER APPARATE BOZER, Gerbergasse, Italy"

to

-- [73] Assignee: DURST AG FABRIK FOTOTECHNISCHER APPARATE, Bozen, Italy --.

Signed and Sealed this

*Thirteenth* Day of *December 1977*

[SEAL]

*Attest:*

RUTH C. MASON
*Attesting Officer*

LUTRELLE F. PARKER
*Acting Commissioner of Patents and Trademarks*